US006772143B2

(12) United States Patent
Hung

(10) Patent No.: US 6,772,143 B2
(45) Date of Patent: Aug. 3, 2004

(54) METHOD AND SYSTEM FOR MANAGING MESSAGES

(75) Inventor: Yat-Sang Hung, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 215 days.

(21) Appl. No.: 09/753,374

(22) Filed: Jan. 2, 2001

(65) Prior Publication Data

US 2002/0087584 A1 Jul. 4, 2002

(51) Int. Cl.[7] .............................................. G06F 17/30
(52) U.S. Cl. .......................... 707/3; 707/204; 706/45; 706/47; 709/206; 709/207; 709/234
(58) Field of Search ........................... 707/3, 204, 200; 706/45, 47; 709/206, 207, 217, 234; 370/356

(56) References Cited

U.S. PATENT DOCUMENTS

| 5,283,856 A | * | 2/1994 | Gross et al. ................. 706/47 |
| 5,799,307 A | | 8/1998 | Buitron ....................... 707/100 |
| 5,917,489 A | * | 6/1999 | Thurlow et al. ............. 345/809 |
| 6,119,014 A | | 9/2000 | Alperovich et al. ......... 455/466 |
| 6,205,330 B1 | * | 3/2001 | Winbladh .................... 455/426 |
| 6,226,630 B1 | * | 5/2001 | Billmers ......................... 707/3 |
| 6,233,318 B1 | * | 5/2001 | Picard et al. ............. 379/88.17 |
| 6,356,937 B1 | * | 3/2002 | Montville et al. .......... 709/206 |
| 6,587,458 B1 | * | 7/2003 | Burg et al. .................. 370/356 |
| 2002/0120690 A1 | * | 8/2002 | Block .......................... 709/206 |

OTHER PUBLICATIONS

Microsoft Outlook "Inbox Assistant," by Microsoft Corporation, Redmond, Washington (information; no document).
Microsoft Outlook "Rules Wizard," by Microsoft Corporation, Redmond, Washington (information; no document).

* cited by examiner

Primary Examiner—Charles Rones

(57) ABSTRACT

A method and system for management of messages. Upon receipt of a message, or at another time, the machine may automatically extract a parameter value from the message and create a new folder for storing messages that match that parameter value. The machine may thus store the message, and other messages that match the parameter value, in the folder. Alternatively, the machine may present the message to a user and allow a user to select one or more values from the message, to be used as a filter for a folder. The machine may then store the message, and other messages that match the filter, in the folder.

23 Claims, 3 Drawing Sheets

METHOD AND SYSTEM FOR MANAGING MESSAGES

BACKGROUND

1. Field of the Invention

The present invention relates to communications services and, more particularly, to a method and system for managing messages in a wireless subscriber station or other communications terminal.

2. Description of Related Art

The recent explosive growth of the telecommunications industry has ushered in a new era of convenience and interaction. Through the advent and acceptance of wireless communications (such as cellular telephony for instance) and Internet communications, it is now commonplace for a person to receive messages at virtually any location and any time of day. As a result, however, users may tend to be overwhelmed with incoming and outgoing messages of all sorts, such as short message service (SMS) messages, e-mail messages, voice mail messages, and the like. It would therefore be advantageous to provide a method and system for managing messages.

SUMMARY

The present invention provides a method and system for organizing messages that arrive at a communication terminal or other machine, such as wireless subscriber station for instance. According to one aspect, upon receipt of a message, the communication terminal may automatically determine the value of a parameter in the message, and then responsively create a new folder to store messages having that parameter value and store the message in the new folder. Thereafter, upon receipt of a new message that matches the parameter value, the terminal may store the new message in the new folder as well. Further, the terminal may label the new folder with a label that corresponds to the parameter value and may use the label to present the folder to a user.

According to another aspect, upon receipt of a message, the communication terminal may present a received-message to a user and may prompt the user to select an expression from the received-message, to be used to identify a new folder. For instance, the subscriber station may present the body (content) of a text message to the user and allow the user to select an expression from the body of the message. The subscriber station may then create a new folder to store messages that match the expression selected by the user and may store the message and other matching messages in the folder.

The foregoing and other advantages and features of an exemplary embodiment will become apparent to those of ordinary skill in the art by reading the following detailed description with reference where appropriate to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

1. Exemplary Architecture

An exemplary embodiment of the present invention can be arranged to facilitate organization of various types of messages. Examples of such messages include text messages, short message service (SMS) messages, e-mail messages, voice mail messages, and video messages, whether unicast, multicast or provided to one or more messaging entities in some other fashion. A system for sending and receiving such message may be compliant with industry standards and/or may be proprietary. Further, the content of the messages may take various forms. For example, messages may be commercially oriented, such as advertisements or coupons for instance, or messages may be personal such as friendly greetings for instance.

The manner of sending and receiving messages is not necessarily critical and may vary from message to message and from machine to machine. For instance, while this description will assume generally that a message is sent from a remote location and received into a communication terminal, a message may be equivalently received in other ways, such as through entry by a user of the terminal, whether as a draft message, outgoing message, incoming message (e.g., memo or note) and/or sent message.

Figure 1:
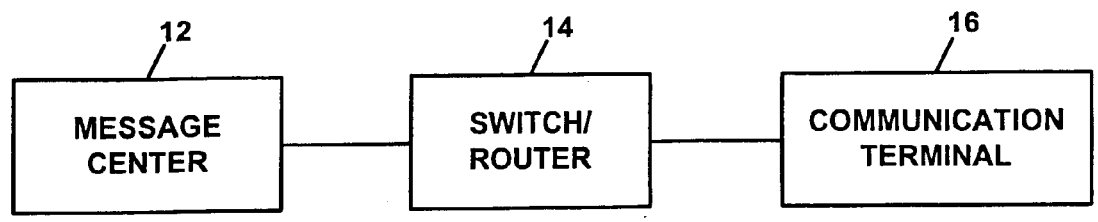
FIG. 1 is a simplified block diagram of an exemplary messaging system in which a message may be sent to a machine in accordance with an exemplary embodiment.

Referring to the drawings, FIG. 1 depicts an exemplary messaging system 10 in which messages can be provided to a communication terminal. Exemplary system 10 includes a message center 12, a switch/router 14 and a communication terminal 16. These components can take a variety of forms and may be positioned in a variety of locations. By way of example, in a wireless telecommunications network (such as a cellular radio-frequency telecommunications network for instance), message center 12 might be a short message service center, switch/router 14 may be a mobile switching center, and communication terminal 16 may be a mobile station such as a cellular telephone, personal digital assistant, pager, notebook computer or other such entity. As another example, message center 12 might be an e-mail server, switch/router 14 might be a network router, and communication terminal 16 might be a computer running an e-mail client application.

Of course, an exemplary messaging system may take other forms as well. For instance, the messaging system may more simply comprise a source entity and a recipient entity. The source entity may be the originator of a message or may be an intermediary element arranged to receive and forward a message. The recipient entity may be the ultimate destination of the message or may also be an intermediary arranged to receive and forward a message. On the other hand, the messaging system may be far more complex, involving a number of entities now known or later developed.

Figure 2:
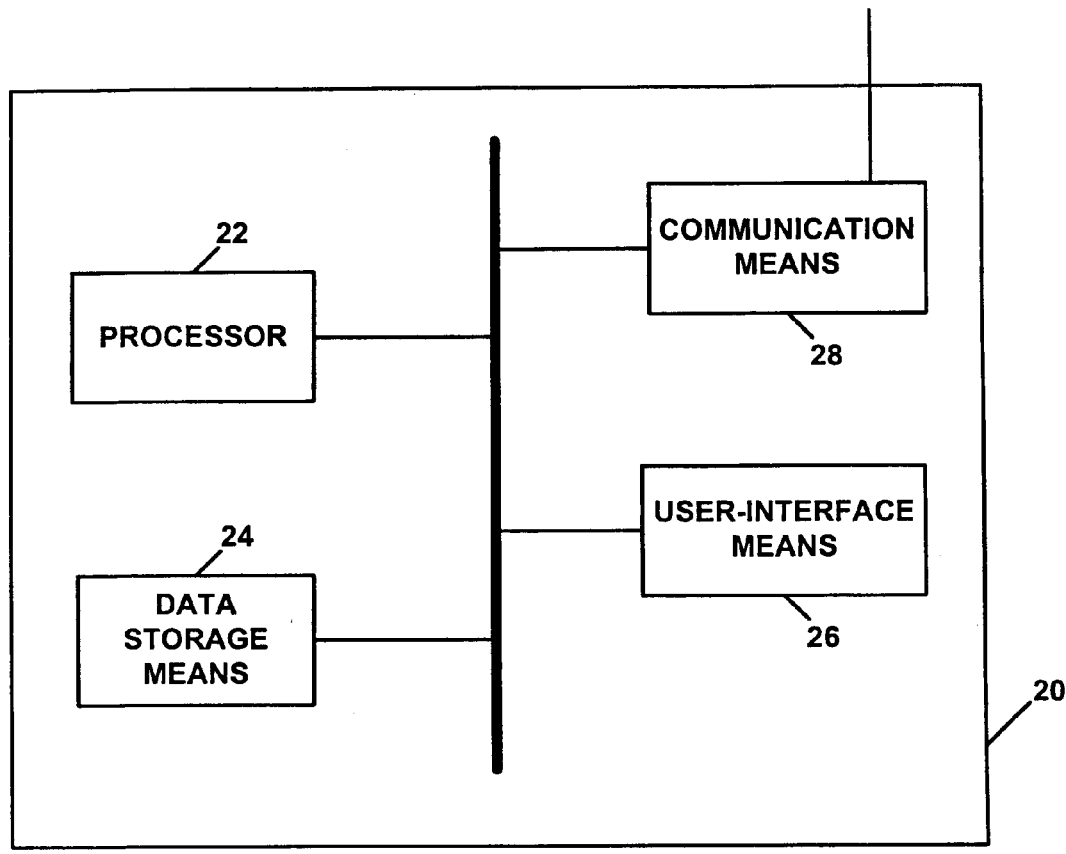
FIG. 2 is a simplified block diagram of a machine suitable for managing messages in accordance with an exemplary embodiment.

For purposes of example, but without limitation, this description will assume that the messaging system takes the form shown in FIG. 1 and that communication terminal 16 is a mobile station or other such machine arranged to receive and manage messages. FIG. 2 is a simplified block diagram depicting an exemplary machine 20 suitable for this purpose.

As show in FIG. 2, exemplary machine 20 may include a processor 22, a data storage means 24, a user interface means 26, and a communications means 28, each of which may be coupled together by a system bus 30. Processor 22 may be a microprocessor suitable for receiving input signals, executing machine language instructions, and providing output signals. Data storage means 24 may comprise one or more volatile and/or non-volatile storage mechanisms, such as random-access-memory (RAM), flash memory, and/or an optical or magnetic disk drive for instance. User interface means 26 may include presentation means such as a display screen and a loudspeaker, headphone jack and/or the equivalent, and input means such as a touch sensitive display, an alphanumeric keypad, scroll keys, a rotary dial, and/or a microphone for instance. Communication means 28 may include an antenna for receiving radio-frequency communications and a receiver for obtaining communications from the antenna.

Machine 20 may thus include hardware, firmware and/or software arranged to carry out functions described herein. In particular, in the exemplary embodiment, machine 20 may be programmed with a messaging client application suitable for receiving, storing and presenting messages. Further, machine 20 may be programmed with a message management system suitable for organizing messages in accordance with the exemplary embodiment. The message management system may comprise machine language instructions stored in the data storage means and executable by the processor to carry out functions described below.

2. Exemplary Operation

Figure 3:
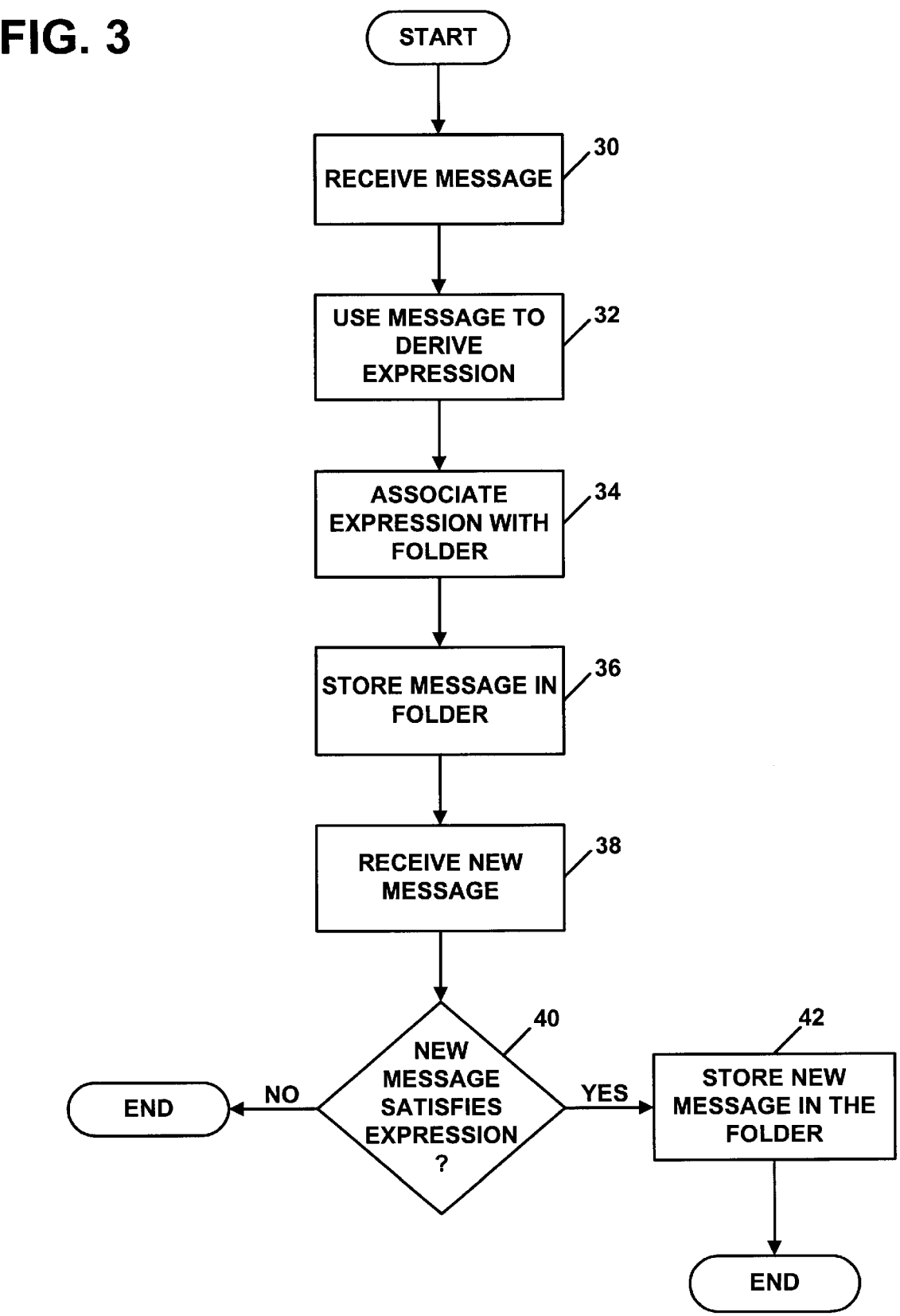
FIG. 3 is a flow chart depicting functions that may be performed by the machine of FIG. 2 in accordance with an exemplary embodiment.

Referring now to FIG. 3, there is shown a flow chart depicting functions that may be performed by machine 20 in accordance with an exemplary embodiment of the invention. As shown in FIG. 3 at block 30, the machine may receive a message. At block 32, the machine may then use the message to derive a message-filter expression based at least in part on the message. At block 34, the machine may establish an association between an existing or newly created folder and the message-filter expression, and, at block 36, the machine may store the message in that folder. At block 38, the machine may then receive a new message, and, at block 40, the machine may determine whether the new message satisfies the message-filter expression. In turn, at block 42, in response to a determination that the new message satisfies the message-filter expression, the machine may store the new message in the folder as well.

a. Receiving a Message

As indicated above, a message received by the machine may take any of a variety of forms. In an exemplary embodiment, the message may have a structure that the machine is programmed to handle. For instance, the message may be compliant with an industry standard such as the Telecommunications Industry Association (TIA)/Electronics Industry Association (EIA) Interim Standard IS-637A ("Short Message Service for Spread Spectrum Systems") or with any other public or proprietary protocol, and the machine may be programmed with logic to be able to receive and maintain the message.

According to the protocol, for instance, the message may define one or more parameters, such as "to", "from", "subject" and "body" fields. Descriptive information about the message (such the "to", "from" and "subject" fields) might be set forth in a header, and the content of the message may then be set forth in the body or payload section of the message. In this regard, exemplary descriptive information might include, for instance, a return ID, a message ID and/or a content descriptor. Examples of a return ID may be a return address, a callback number, a sender name, sender network address, or any other indicia of sender or reply address for instance). Examples of a message ID may be a message serial number, message type (such as coupon, custom ring tone, etc.) or some other identifier of the message. And examples of a content descriptor may be a description of some aspect of the message content, such as an author, artist, a date of creation, message length or subject matter, for instance.

In the exemplary embodiment, the machine may be programmed with logic to be able to locate these particular parameters, if applicable, in a given message. Thus, when the machine receives a message, the machine may parse the message into its respective parameters and/or otherwise be able to reference one or more parameters of the message.

b. Using the Message to Establish a Message-Filter Expression

According to the exemplary embodiment, a message-filter expression may be derived from the received message. In this regard, the message-filter expression could be a single value extracted from within the header or body of the message. Alternatively, the message-filter expression could be more complex, such as a combination of values from the message, possibly coupled together with Boolean operators or other functions (such as time of day, location, user ID, etc.).

i. Using a Predetermined Parameter as the Message-Filter Expression

In one exemplary arrangement, the machine may be programmed to automatically determine (e.g., read) the value of a predetermined parameter (or, equivalently, parameters or one or more parts of parameters) of the message and to set the message-filter expression equal to that value. The predetermined parameter and its associated value can take various forms, depending on a variety of factors. In this regard, the predetermined parameter could be a particular field or segment of the message header or message body, and the machine may be programmed to read a value from that particular field or segment.

Examples of parameter values might then include, for instance, a word, multiple words, an image (determined by file name or pattern or image recognition techniques, for instance), or a sound (e.g., determined by sound or voice recognition techniques, for instance). Specific examples could be a return ID, message ID, or content descriptor, as noted above. Further, the machine may be programmed to truncate any parameter value that is longer than a predetermined maximum length, such as 12 characters (if a text message), for instance.

The identity of the predetermined parameter in a given message could vary depending on the type of the message. If the message is an industry standard message, such as an SMS message or SMTP message, for example, the predetermined parameter may be a field having a position and length defined by the industry standard. Examples include sender name, sender network address, date, and so forth.

Alternatively, the message may be of a proprietary format understood by the message sender and the machine that receives the message. In that case, the proprietary protocol may define a particular field or value in the message, which the machine may be programmed to treat as the predetermined parameter. As an example, one type of message may be a discount coupon or advertisement message. Such a message might include a goods/services parameter that may identify the type of product or service with which the coupon or advertisement is associated, and the machine may be programmed to treat the goods/services code as the predetermined parameter. As another example, another type of message may carry a custom ring tone or other music or video selection. In that case, the message might include a ring-type or artist parameter that may identify the type of ring tone or the artist of the music or video selection.

Each message may have a "type" parameter that identifies the message as being of a particular type (e.g., complying with a particular industry standard or proprietary protocol). The machine may be programmed to identify a type of the message, and to then identify the predetermined parameter based on that message type. In this regard, for instance, the data storage medium of the machine may include a type-parameter table that correlates particular message types with particular predetermined parameters. For example, the type-parameter table might include the following correlations: (i) the predetermined parameter for an SMS message is the CALLBACK NUMBER field, (ii) the predetermined parameter for an SMTP message is the FROM field, and (iii) the predetermined parameter for coupon or advertisement message is the PRODUCT CODE field. Of course, other examples (including but not limited to variations on these examples) are possible as well.

Further, one or more of the predetermined parameters can be set in the machine in any of a variety of manners. For instance, one or more parameters can be programmed into the machine in advance of the receipt of any message (e.g., upon manufacture of the machine). Alternatively, one or more parameters (and/or various program instructions described herein) can be sent or otherwise input to the machine and stored in the data storage medium. With this arrangement, the functionality of the system could be altered by providing new parameters and/or instructions to the machine at any time and/or in response to any stimulus.

Thus, the machine may determine the type parameter of a given message and may then consult the type-parameter table to determine the identity of the predetermined parameter of the message. The machine may then determine the value of that predetermined parameter of the message and set the message-filter expression equal to the value.

For certain predetermined parameters, the machine may further be programmed to determine the value of the parameter, to translate the value to another value, and to set the message-filter expression equal to that other value. For example, according to the industry standard SMS protocol, an SMS message may include a callback number, which may be a conventional directory number (e.g., telephone number). Many SMS-capable entities such as wireless subscriber stations may also include or have reference to a stored directory listing names and corresponding directory numbers. Provided with such a directory, upon receipt of an SMS message bearing a callback number, the machine may search the directory for an entry bearing the callback number. If the machine finds such an entry, the machine may then retrieve the corresponding name from the entry and may set the message-filter expression equal to that name, rather than the callback number.

For example, if an SMS arrives at a mobile station and bears callback number 555-1235-4567, the mobile station may automatically reference a directory and determine that the callback number corresponds to a listing for John Doe. Consequently, the mobile station may automatically set the message-filter expression equal to "John Doe." Alternatively, if the mobile station does not find an entry for the number 555-123-4567 in the directory, the mobile station might default to setting the message-filter expression to be "555-123-4567" for instance.

Further, the machine may be programmed to prompt the user for approval of the translation, before effecting the translation. For instance, in the example above, before translating the callback number into the name "John Doe," the machine may be programmed to present a prompt to the user, via the display screen, asking whether the user wishes to set the filter to "John Doe" as indicated in the directory. Upon receipt of approval from the user, such as through actuation of a designated key for instance, the machine may then proceed to set the message-filter expression to be "John Doe."

The machine can be programmed to set the message-filter expression to be simply the value of the predetermined parameter (or a translation of that value). For example, in the example immediately above, the machine might be programmed to set the message-filter expression to be "John Doe." Alternatively, the machine might be programmed to set the message-filter expression to be an expression that indicates a parameter and a value or expression that the parameter must satisfy. For example, indicate that the sender name should be John Doe, the expression may be set to be "SENDER(John Doe)." Other examples and arrangements of the message-filter expression are possible as well.

ii. Establishing the Message-Filter Expression with User Interaction.

In another exemplary arrangement, the machine may be programmed to present a received-message to a user and to allow the user to select one or more values from the message, to be used as the message-filter expression. For instance, if the message is a text message, the machine may display the text message to the user on a display screen and may prompt the user to select at least one value from the message. Further, the machine may present the user with options to select Boolean expressions or other functions to be combined together with the one or more selected values so as to build the message-filter expression.

Any of a variety of selection techniques may be used. For example, the machine may be programmed to highlight the first word or phrase of the message and to allow the user to scroll through the message, word by word, and to select any given highlighted word(s). To do so, the machine may be programmed to respond to user actuation of a scroll key, rotary dial, touch sensitive display, softkey, voice response unit or other selection key, by moving the highlighting to the next word of the message, and the machine may be programmed to respond to user actuation of an "OK" softkey or other suitable selection of the word by recording the highlighted word to memory as at least part of the message-filter expression.

As in the process described above, the machine may record simply the value of the highlighted word. Alternatively, the machine may record an indication of a parameter and an associated value. For instance, if the user has selected the word "Chicago" from the body of a text message, the machine might store in memory the expression "BODY(Chicago)" as at least part of the message-filter expression.

Once the user has selected a word from the message, if the user selects another word from the message, the machine may be programmed to connect the additional word to the first word with a Boolean "AND" and to save the combination in memory as at least part of the message-filter expression. For example, if a user first selects the word "Chicago" from a message and then selects the word "weather" from the body of the message, the machine might be programmed to store "BODY(Chicago) AND BODY (weather)" or the equivalent in memory as the message-filter expression. As another example, if the user first selects the word "Chicago" from the subject line of the message and then selects the word "weather" from the body of the message, the machine might be programmed to store "SUBJECT(Chicago) AND BODY(weather)" in memory as the message-filter expression.

Alternatively or additionally, the machine may be programmed to present the user with a list of Boolean expressions such as AND and OR, which the user may select so as to tie together words that the user selects from the message, so as to build a more complex message-filter expression. Further, the machine may be programmed with an "edit" mode, in which a user may edit a given message-filter expression if desired.

The machine may present both header and content information for a given message or may present only header or content information. From the header information, a user might select a sender address, a callback number, or the like, to be used as at least part of the message-filter expression. From the content information, a user might select still other words for use in the expression.

Further, just as the machine can be programmed to translate the value of a predetermined parameter to another value as described above, the machine can be programmed to translate some or all parts of a message-filter expression selected by a user into other values. For instance, if a user selects a callback number as at least part of a message-filter expression, the machine may automatically prompt the user to approve translation of the callback number into a corresponding name listed in a directory.

Still further, the processes of establishing a message-filter expression by reference to a predetermined parameter and establishing a message-filter expression with user interaction could be combined. For example, the machine may automatically create a message-filter expression upon receipt and/or presentation of a message, and the machine may present the message to a user to allow the user to edit the message-filter expression by selecting values from message.

c. Associating the Message-Filter Expression with a Folder.

Having obtained the message-filter expression, the machine may then associate the message-filter expression with a message folder in the data storage means 24, thereby establishing an auto-file rule indicating that a message that matches the message-filter expression value should be stored in the folder.

Generally speaking, a message folder may be any actual or virtual storage location in which information such as messages may be held. Thus, for instance, in a conventional file structure, a message folder may be a directory in which messages may be stored as individual files.

In practice, each message may in fact be stored at a respective address in the data storage means (e.g., in flash memory), and the message folder may be located at a particular address that serves as the beginning of a linked list or other data structure comprised of a number of pointers to the addresses of the messages stored "in" the folder. The top component of the linked list may include folder-identification information and may then point to the address of a first message stored in the folder, and so forth. The machine may thus create a new folder by recording the beginning of such a linked list in the data storage medium. Those skilled in the art will appreciate that other suitable mechanisms to establish or maintain folders may exist or be developed as well and may vary depending on the architecture of the particular machine.

The machine may employ any of a variety of means to associate a message-filter expression with a message folder. As one example, the machine may maintain in its data storage medium a folder-table that specifies for each folder a set of folder-identification information such as (i) the address of the folder, (ii) a message-filter expression associated with the folder, and (iii) a label of the folder. Thus, to associate a message-filter expression with a folder, the machine may select an existing folder or may create a new folder and may then store the message-filter expression in record for the folder in the folder-table. The message-filter expression for a given folder may be stored in the table as a character string or in any other suitable form.

As another example, the message-filter expression for a given folder could be stored as part of the folder-identification information in the top of the linked list that defines the folder. A folder-table could then be established that merely refers to the addresses of folders, so that the machine could reference a message-filter expression by referring to the address of a given folder as indicated in the folder-table. Still other examples of associating a message-filter expression with a message folder are possible as well.

In the exemplary embodiment, the machine may also be programmed to create a label for each folder. The label may be used to facilitate display of a list of folders, so that a user can later select a folder name to retrieve messages in the folder or so that a user can take some other action with respect to a particular folder.

In the exemplary embodiment, the label may be identical to the message-filter expression or may alternatively be a first word or other truncated portion of the message-filter expression. Alternatively or additionally, the machine may prompt a user to specify or edit a label for a given folder and may then receive a label designated by the user. As indicated above, the machine may store the folder label in the data storage medium as part of the folder-identification information. Alternatively, the machine may maintain the folder label elsewhere.

Note that, as an exemplary alternative to the process described above, rather than translating a parameter value, the machine may leave a given parameter value unchanged and may instead simply assign a translation of the value to the label. For example, if a callback number value is 555-123-4567, the machine may set the message-filter expression to be "CALLBACK(5551234567)," and, with reference to a local directory, the machine may set the label of the associated folder to be "John Doe." That way, the machine may list the folder as "John Doe" for convenient reference by a user.

d. Example Process Flow

Figure 4:
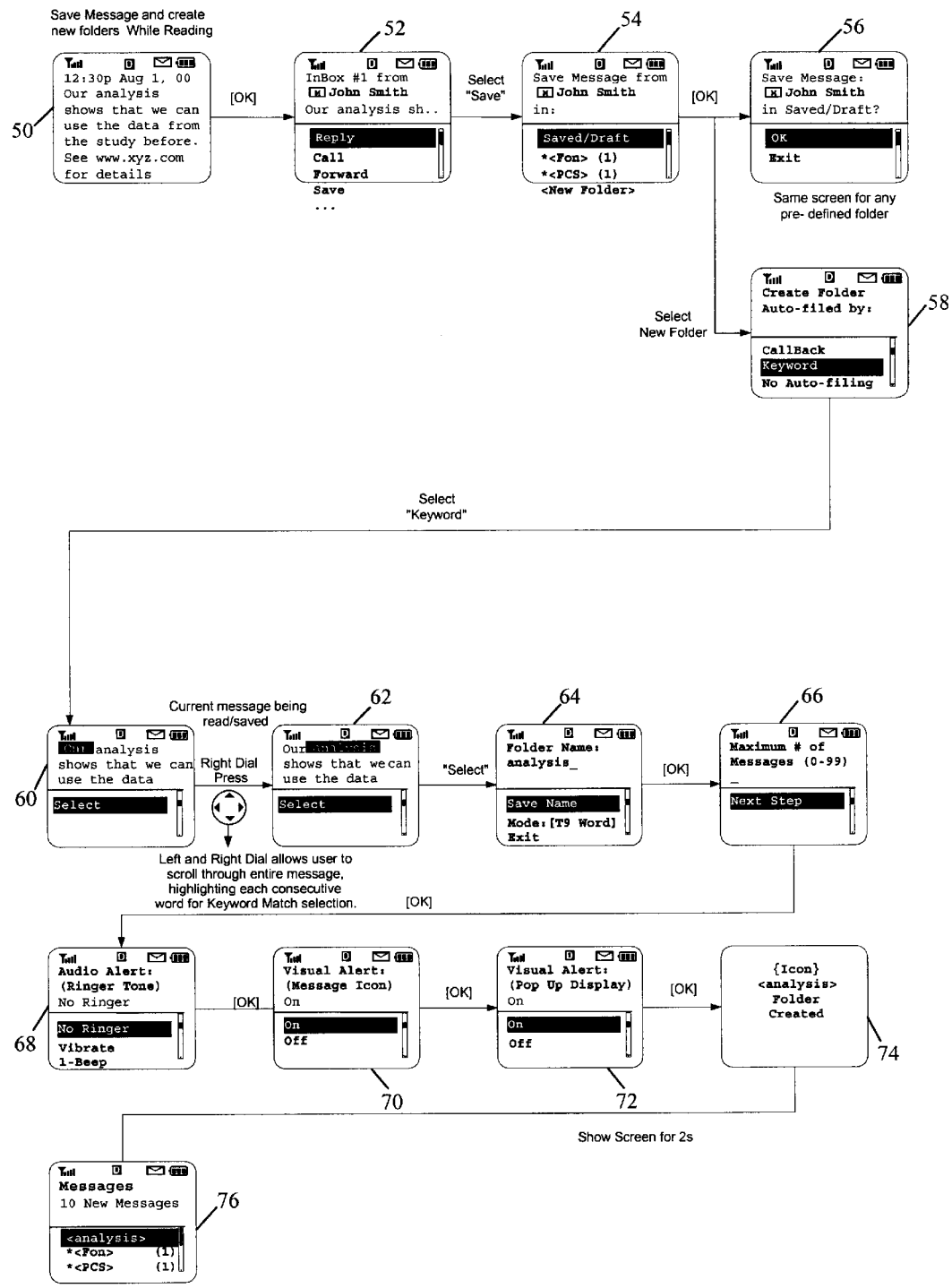
FIG. 4 is a process flow depicting a sequence of screen displays for establishing an auto-file rule by reference to message content in accordance with an exemplary embodiment.

Referring now to FIG. 4, there is shown an example series of screen displays that the machine may be programmed to present to a user so as to facilitate creation of a new folder with a message-filter expression based on a received-message. FIG. 4 assumes that the machine has received an SMS message and that the machine is displaying the message on a display screen that is part of user interface means 26, for viewing by a user. By way of example, the user may have selected the message from a list of messages in an in-box, or the machine may have automatically displayed the message. Other examples are possible as well.

As shown in FIG. 4, at block 50, the message is presented on the display screen. When the message is displayed, the machine may conventionally also present the user with an "OK" softkey or other such key selectable by the user to indicate user acceptance. The machine may be programmed to respond to actuation of the OK key by displaying (i) in a top portion of the screen a scrollable block of text including the sender name (e.g., "John Smith") and the text of the message and (ii) in a bottom portion of the screen a number of choices selectable by the user by conventional means, as shown at block 52. One such choice may a "SAVE" choice. In response to user selection of that choice, for instance, the machine may then prompt the user to select a folder under which the user wishes to store the message, as shown at block 54.

At that screen, the user may select "Saved/Draft" to indicate a desire to store the message in a folder under the Saved/Draft category. In turn, at block 56, the machine may prompt the user to confirm the user's desire to store the message under "Saved/Draft," and the user may select "OK."

Alternatively, from the screen shown at block 54, the user may select "New Folder" to indicate a desire to store the message in a new folder. In response, at block 58, the machine may present the user with a number of choices for auto-filing of the message. One such choice may be "Keyword," to facilitate creation of a new folder based on a keyword selected from the message itself.

At block 60, in response to user selection of the "Keyword" choice, the machine may scrollably display the text of the message in the top portion of the screen and may provide a "Select" choice in the bottom section of the screen. Using scroll keys, a dial, or another suitable actuator, the user may then scroll through message, directing the machine to highlight each consecutive word of the message. Thus, at block 60, the machine may initially highlight the first word of the message ("Our"). In response to user actuation of a right dial key, the machine may then move to highlight the next word of the message ("analysis"), as shown at block 62.

In response to user actuation of the "Select" choice-item, the machine may then automatically establish "select" (or "BODY(Select)", for instance) as a message-filter expression and associate that message-filter expression with a folder in the data storage means. Given that the value of the message-filter expression is "analysis" in this instance, the machine might then programmatically assign the label "analysis" to the folder. At block 64, the machine may then display the folder name "analysis" in the top portion of the screen and allow the user to confirm the name by selecting the choice "Save Name" from a list of choices in the bottom portion of the screen. At block 66, the user may then direct the machine to proceed to the next step of the process.

Beginning at block 68, the user may then associate certain actions or absence thereof with the folder just created. For instance, at block 68, the machine may present the user with a choice for an alert to be presented when a new message arrives that matches the message-filter expression of the folder. The machine may allow the user to select "No Ringer", "Vibrate" or "Beep" as shown, or the machine may allow the user to select any of a variety of custom ring tones and/or other sorts of alerts for the folder. At block 70, the machine may ask the user to specify whether the machine should provide a visual alert upon receipt of a new message that matches the message-filter expression of the folder. Further, at block 72, the machine may ask the user to specify whether the machine should pop-up any incoming message that matches the message-filter expression of the folder. Other options and variations on these options are possible as well.

At block 74, the machine may then briefly present the user with a confirmation that the new folder has been created. In this example arrangement, at block 76, the machine may then return to present a list of message available folders.

e. Handling new messages

In the exemplary embodiment, once the machine has associated a message-filter expression with a message folder, if the machine receives a new message, the machine may responsively determine whether the new message satisfies the message-filter expression. More particularly, when the machine receives a new message, the machine may determine whether the message satisfies a message-filter expression associated with any of the existing message folders.

The machine may perform this function in various manners. For instance, if the machine maintains a folder-table such as that described above (or the like), the machine may query the table to determine whether the new message matches any of the message-filter expressions listed in the table. In the exemplary embodiment, the machine may look for the first match of a message-filter expression and responsively conclude that the new message belongs in folder with which the message-filter expression is associated.

The process of determining whether a given message satisfies a given message-filter expression may vary depending on the form of the message-filter expression. For example, if a message-filter expression is simply the value of a parameter (such as "weather") for instance, the machine may be programmed to extract the value of a predetermined parameter from the message (and to possibly translate the parameter as described above). The machine may then compare the extracted value with the value of the message-filter expression. If the values match, then the machine may conclude that the message satisfies the message-filter expression. If not, the machine may proceed to determine if the message matches another message-filter expression, if any.

As another example, if the message-filter expression is more complex, such as an indication of a particular message and a value or expression for that field, then the machine may determine whether the new message satisfies that more complex message-filter expression. For example, if the message-filter expression is "SUBJECT(Chicago) AND BODY(weather)," the machine may responsively determine if the subject field of the new message contains the word "Chicago" and the body field of the new message contains the word "weather." If both of these conditions are met, then the machine may conclude that the message matches the message-filter expression. If not, the machine may proceed to determine if the message matches another message-filter expression, if any. Still other examples may exist as well.

If the machine finds that the message satisfies a existing message-filter expression, the machine may then automatically store the message in the folder with which that message-filter expression is associated. Alternatively, if the machine does not find that the message satisfies the message-filter expression of any existing folder, the machine may proceed to create a new folder for the message, through a process such as those described above for instance.

For example, assume that the machine has created a folder with a message-filter expression "SENDER(John Doe)". Assume next that the machine receives a new SMS message with the callback number 555-123-4567. In view of the fact that the message is an SMS message, the machine may be programmed to read the callback number value from the callback number parameter of the message. The machine may then programmatically consult a local directory and determine that the callback number corresponds to the sender value "John Doe." In turn, the machine may search through the message-filter expressions of any existing folders and may determine that the value John Doe matches the expression "SENDER(John Doe)." Consequently, the machine may automatically store the message in that folder.

As another example, assume that the machine has created a folder with the message-filter expression "ARTIST (Beatles)". Assume next that the machine receives a proprietary-format message carrying an MP3 song as an attachment (or, for that matter, a custom ring tone to the tune of a song), and that an "Artist" parameter of the message indicates that the song is a Beatles song. The machine may be programmed to detect the type of message and may thus responsively be able to parse the message so as to reference its various parameters, including the "Artist" parameter. The machine may then programmatically search the message-filter expressions of any existing folders and may thereby determine that the message matches the expression "ARTIST(Beatles)." Therefore, the machine may automatically store the message in that folder.

3. Conclusion

Exemplary embodiments of the present invention have been described above. Those skilled in the art will understand, however, that changes and modifications may be made to these embodiments without departing from the true scope and spirit of the present invention, which is defined by the claims.

I claim:

1. A method for managing messages, the method comprising:
   receiving a message into a machine; and
   executing machine language instructions upon receipt of the message, to perform a set of functions including (i) automatically determining a value of a predetermined parameter of the message, (ii) automatically creating a folder for holding messages that match the value, and (iii) automatically storing the message in the folder.

2. The method of claim 1, further comprising:
   after creating the folder, receiving a new message; and
   executing machine language instructions to determine if the new message matches the value and, if so, to store the new message in the folder.

3. The method of claim 2, wherein the message defines a message type, and wherein determining a value of a predetermined parameter comprises:
   using the message type as a basis to identify the predetermined parameter; and
   thereafter determining from the message the value of the predetermined parameter.

4. The method of claim 2, wherein the new message defines a new value, and wherein executing machine language instructions to determine if the new message matches the value comprises executing machine language instructions to determine if the new value is the same as the value.

5. The method of claim 2, wherein the set of functions further includes:
   prompting a user to authorize creation of the folder and receiving user authorization before creating the folder.

6. The method of claim 2, wherein the parameter value comprises a value selected from the group consisting of (i) a word, (ii) a plurality of words, (iii) an image, and (iv) a sound.

7. The method of claim 2, wherein the parameter value comprises a value selected from the group consisting of (i) a return ID, (ii) a message ID, and (iii) a content descriptor.

8. A method for managing messages, the method comprising:
   receiving a message into a machine:
   executing machine language instructions to cause the machine to present the message to a user and to prompt the user to select one or more parameter values from the message;
   thereafter receiving user input provided in response to the prompt, the user input indicating a selection of at least one parameter value from the message;
   executing machine language instructions, in response to the user input, to create a folder for holding messages that match the at least one parameter value;
   executing machine language instructions to store the message in the folder;
   thereafter receiving a new message; and
   executing machine language instructions to determine if the new message matches the at least one parameter value and, if so, to store the new message in the folder,
   wherein the message defines a message body containing words,
   wherein executing machine language instructions to cause the machine to present the message to a user comprises executing machine language instructions to cause the machine to present the words of the message body to the user,
   wherein executing machine language instructions to cause the machine to prompt the user for the user input comprises executing machine language instructions to cause the machine to highlight at least one word of the message body, and
   wherein the method further comprises providing the user with a selection key that is selectable by the user to establish that the at least one word is the selection.

9. The method of claim 8, wherein the at least one parameter value comprises a value selected from the group consisting of (i) a word, (ii) a plurality of words, (iii) an image, and (iv) a sound.

10. The method of claim 8, wherein the at least one parameter value comprises a value selected from the group consisting of (i) a return ID, (ii) a message ID, and (iii) a content descriptor.

11. The method of claim 8, wherein executing machine language instructions to create a folder for holding messages that match the at least one parameter value comprises executing machine language instructions to perform functions comprising:
   creating the folder;
   creating an auto-file rule for the folder, indicating that a message that matches the at least one parameter value should be stored in the folder; and
   labeling the folder with a label associated with the at least one parameter value, whereby the label may be presented to a user to facilitate user selection of the folder.

12. The method of claim 11, wherein creating an auto-file rule comprises:
   translating the at least one parameter value from a first value to a second value, and establishing for the folder a message-filter expression comprising the second value.

13. The method of claim 12, wherein the first value comprises a callback number, the second value comprises a name, and translating the at least one parameter value comprises determining by reference to a directory that the name corresponds to the callback number.

14. The method of claim 11, wherein the at least one parameter value comprises a callback number, and wherein labeling the folder with a label associated with the at least one parameter value comprises:
   finding a directory listing that correlates the callback number with a name; and
   labeling the folder with the name.

15. An automatic message-organization system comprising, in combination:
   a processor;

a data storage medium;

an interface for receiving messages; and a set of machine language instructions stored in the data storage medium and executable by the processor, in response to receipt of a message, (i) to automatically select at least one parameter value from the message, (ii) to responsively generate in the data storage medium a folder for holding messages that match the at least one parameter value, and (iii) to automatically store the message in the folder.

16. The automatic message-organization system of claim 15, wherein the message defines a message type, and wherein the machine language instructions are executable by the processor (i) to use the message type as a basis to identify a predetermined parameter of the message and (ii) to select a value of the predetermined parameter as the at least one parameter value.

17. The automatic message-organization system of claim 15, wherein the machine language instructions are executable by the processor to present the message to a user and to prompt the user to select the at least one parameter value from values defined by the message.

18. The automatic message-organization system of claim 15, wherein the message defines a message body containing words, wherein the machine language instructions are executable by the processor to present the words of the message to the user and to receive from the user a selection signal indicating as the at least one parameter value at least one word of the message.

19. The automatic message-organization system of claim 15, wherein the at least one parameter value comprises a value selected from the group consisting of (i) a word, (ii) a plurality of words, (iii) an image, and (iv) a sound.

20. The automatic message-organization system of claim 15, wherein the at least one parameter value comprises a value selected from the group consisting of (i) a return ID, (ii) a message ID, and (iii) a content descriptor.

21. The automatic message-organization system of claim 15, wherein the at least one parameter value comprises a callback number, and wherein the machine language instructions are executable by the processor (i) to find a directory listing that correlates the callback number with a name and (ii) to label the folder with the name, whereby the label may be presented to a user to facilitate user selection of the folder.

22. The automatic message-organization system of claim 15, wherein, in response to receipt of a new message after the folder has been created, the machine language instructions are executable by the processor (i) to determine whether the new message matches the at least one parameter value and, if so, (ii) to store the new message in the folder.

23. The automatic message-organization system of claim 15, embodied in a mobile station.

* * * * *